United States Patent
Ma et al.

(10) Patent No.: US 6,366,483 B1
(45) Date of Patent: Apr. 2, 2002

(54) PWM RECTIFIER HAVING DE-COUPLED POWER FACTOR AND OUTPUT CURRENT CONTROL LOOPS

(75) Inventors: Daming Ma; Bin Wu, both of Toronto; Navid R. Zargari; Steven C. Rizzo, both of Cambridge, all of (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/621,847

(22) Filed: Jul. 24, 2000

(51) Int. Cl.[7] .......................... H02M 5/42; H02M 1/17
(52) U.S. Cl. ..................... 363/87; 363/37; 363/41
(58) Field of Search ........................ 363/87, 89, 37, 363/40, 41, 39, 124; 323/282, 283, 286

(56) References Cited

U.S. PATENT DOCUMENTS

| | | | | |
|---|---|---|---|---|
| 4,066,938 A | * | 1/1978 | Turnbull | 363/40 |
| 4,575,668 A | * | 3/1986 | Baker | 318/811 |
| 5,751,563 A | * | 5/1998 | Bjorklund | 363/35 |
| 5,903,066 A | * | 5/1999 | Enjet et al. | 307/105 |
| 5,905,642 A | * | 5/1999 | Hammond | 363/37 |

* cited by examiner

Primary Examiner—Rajnikant B. Patel
(74) Attorney, Agent, or Firm—Himanshu S. Amin; Alexander M. Gerasimow; William R. Walbrun

(57) ABSTRACT

A PWM rectifier wherein the switching bridge has m input filter capacitors, each connected at a terminal thereof, to the line side of the bridge. These terminals are used to connect an m-phase a.c. power supply (m>=1) having a per phase system inductance to the bridge. A current smoothing inductor is connected to the load side of the bridge and enables a load to be connected thereto. A switching pattern generator controls the switches in the switching bridge based on a reference output current. A first control loop is provided for determining an active portion of the reference output current based on a desired power level of the load and an m-phase voltage at the capacitor terminals. A second control loop is provided for determining a reactive portion of the reference output current based on the m-phase voltage at the capacitor terminals. The reactive portion of the current is selected so as to obtain a desired per phase power factor, such as unity, on the power supply. In this manner the output current and power factor control loops are independent of and not coupled to one another.

16 Claims, 11 Drawing Sheets

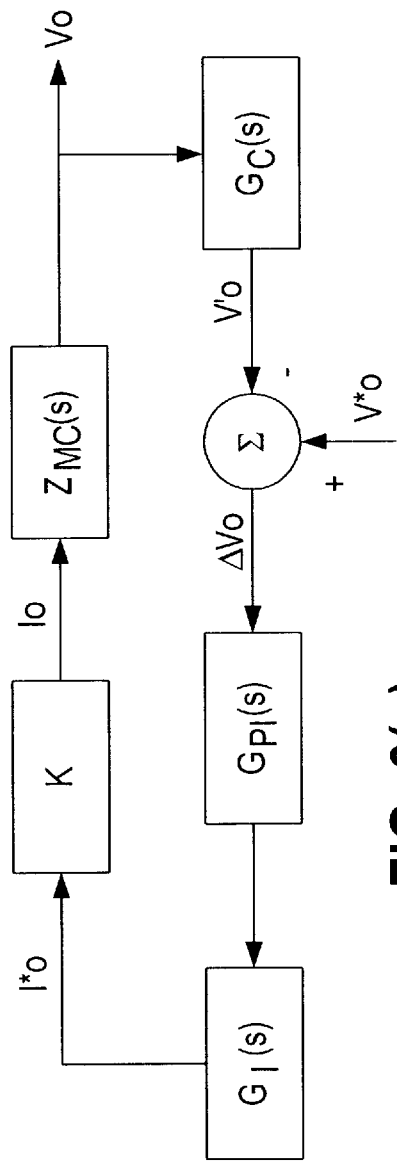
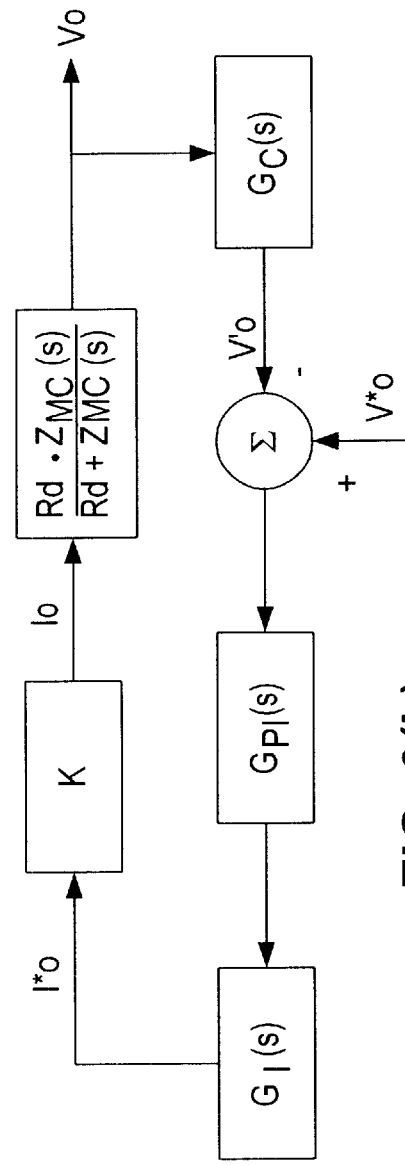
FIG. 6(a)
FIG. 6(b)

PWM RECTIFIER HAVING DE-COUPLED POWER FACTOR AND OUTPUT CURRENT CONTROL LOOPS

FIELD OF INVENTION

The invention generally relates to the field of power electronics. More particularly, the invention relates to a pulse-width modulated (PWM) rectifier wherein the reactive and active powers are controlled independent of one another for improved performance. The PWM rectifier has particular utility in a current source inverter (CSI) based drive for controlling one or more high power alternating current (a.c.) induction motors.

BACKGROUND OF INVENTION

CSI-based a.c. motor drives are increasingly used in high power (e.g., 1,000~10,000 hp) applications. See, for instance, P. M. Espelage and J. M. Nowak, "Symmetrical GTO Current Source Inverter for Wide Speed Range Control of 2300 to 4160 volt, 350 to 7000hp, Induction Motors", IEEE IAS Annual Meeting, pp 302–307, 1988. Compared with voltage source inverter fed drives, the CSI drive features simple structure, reliable short circuit protection, four quadrant operation capability and nearly sinusoidal output voltage and current waveforms. In addition, the symmetrical gate turn-off thyristor (GTO) switching devices typically used in CSI drives can be easily connected in series, which makes the CSI drive particularly suitable for implementation at medium/high voltage levels such as 4160 Volts and up. Further details concerning the benefits of the CSI drive can be found in F. DeWinter and B. Wu, "Medium Voltage Motor Harmonic Heating, Torques and Voltage Stress When Applied on VFDs", IEEE 43rd PCIC Conference, pp 131–139, 1996.

In many industrial applications, it is often necessary to control multiple motors in some manner. In these cases, it will be more economical to drive all motors by a single drive system rather than implementing individual drive/motor systems. To date, however, the CSI drive has typically been applied to single-drive/single-motor applications.

The CSI drive is not problem-free. In the CSI drive with a single a.c. induction motor, there exists a resonance mode due to the parallel connection of the output filter capacitor and the motor. This makes it difficult to stabilize the system if the drive operates at a frequency which is close to the resonant frequency. Further details concerning this problem can be found in the following two references, both of which are incorporated herein in their entirety: B. Wu, F. DeWinter, "Elimination of Harmonic Resonance in High Power GTO-CSI Induction Motor Drives", IEEE PESC Conf. pp 1011–1015, 1994; and R. Itoh, "Stability of Induction Motor Drive Controlled by Current-source Inverter", IEE Proc. Vol. 136, Pt. B, No. 2, pp 83–88, 1989. The situation becomes even worse when the motor is unloaded since the inverter output current in this case is minimal whereas the resonant current flowing between the capacitor and the motor magnetizing inductance is substantial.

A similar resonance problem also exists when a PWM rectifier is employed in the drive to provide direct current to the CSI from a power source. In this case, a resonance mode exists between an input a.c. filter capacitor of the rectifier and the system impedance of the line voltage source. If the resonance frequency is close to a characteristic harmonic of the rectifier an oscillation will occur, which makes the stability of the PWM rectifier sensitive to the system impedance. Unfortunately it is difficult to measure the system impedance accurately, which complicates the design of a compensating filter. In addition, even when the resonance frequency is not close to any characteristic harmonic of the rectifier, undesired oscillations will also occur during transient states. See additionally, N. R. Zargari, G. Joos, and P. D. Ziogas, "Input Filter Design for PWM Current-Source Rectifiers", IEEE Trans. on Ind. Appl., vol. 30, No. 6, pp 1573–1579, 1994.

When the PWM rectifier is used to provide direct current to the CSI it can sometimes be difficult to tune the control compensators of the PWM rectifier. This will be better understood by reference to FIG. 11 which shows a block diagram of a typical control scheme for a PWM rectifier 100 with unity power factor control which, in conjunction with a smoothing d.c. link inductor $L_{dc}$, provides direct current for CSI 110. The rectifier comprises two control loops: a power factor control loop 112 and a d.c. link current control loop 114. In the power factor control loop 112, the phase angle between the source voltage $\vec{v}_s$ and the source current $\vec{i}_s$ is detected by a phase detector 116 and sent to a p.i. (proportional, integral) compensator 118 which controls the phase angle α of the rectifier output current in order to ensure a unity power factor on the voltage source 22. The d.c. link current $i_{dc}$ is controlled by adjusting the modulation index M of the rectifier 100 by another p.i. compensator 120 so as to minimize the error between a requested d.c. link current $i^*_{dc}$ (this signal is provided by CSI controller) and the actual or measured value of the d.c. link current $i'_{dc}$. The source voltage $\vec{v}_s$ is detected to provide the synchronizing signal for the rectifier 100. This control scheme is not entirely satisfactory because the phase angle control loop 112 effects not only the power factor but also the d.c. link current. Similarly, the modulation index control loop 114 effects the power factor. Consequently, the coupling between these control loops 112 and 114 can make it difficult to tune the p.i. compensators 118 and 120. Another drawback of this control scheme is that the rectifier 100 maybe saturated under some operating conditions due to the power factor compensation.

In a CSI drive with multiple motors, there are two major technical challenges which must be overcome to make such a drive practical. First, the motors connected to the inverter may have different sizes, which may produce multiple resonant modes. The effect of these and other resonant modes on drive stability should be minimized, and the drive should be able to operate steadily over a full speed range. Second, the inverter output voltage should be kept constant both in steady and transient states for a given output frequency. In other words, the inverter output voltage should be stiff, not affected by changes in multiple motor loads. Otherwise an interaction between the motors and inverter will occur when one or more motors are loaded or unloaded, making the system unstable. A solution to these problems is described herein.

Furthermore, when the PWM rectifier is used to provide d.c. current to the CSI, the problem of tuning the control compensators is present. The invention seeks to overcome this problem.

SUMMARY OF INVENTION

The general utility of the invention(s) described herein relate to improved CSI-based motor drives. However, those skilled in the art will understand that the various aspects of the invention may be employed more generally in the field of power electronics.

Generally speaking, the invention provides a rectifier which has independent power factor and d.c. link current control loops. This is accomplished by separately controlling the active power and the reactive power of the rectifier.

According to one aspect of the invention a rectifier is provided which comprises a switching bridge for converting alternating current into direct current. The bridge features a line side and a load side. The bridge has m input filter capacitors, each connected at a terminal thereof, to the line side. These terminals are used to connect an m-phase a.c. power supply (m>=1) having a per phase system inductance to the bridge. A current smoothing inductor is connected to the load side of the bridge and enables a load to be connected thereto. A switching pattern generator controls the switches in the switching bridge based on a reference output current. A first control loop is provided for determining an active portion of the reference output current based on a desired power level of the load and an m-phase voltage at said terminals. A second control loop is provided for determining a reactive portion of the reference output current based on the m-phase voltage at said terminals. The reactive portion of the current is selected so as to obtain a desired per phase power factor, such as unity, on the power supply.

In a three phase (i.e., m=3) embodiment of such a rectifier is disclosed herein. The illustrated embodiment employs a transformation block for transforming the 3-phase voltage at the capacitor terminals into a two-phase voltage in a rotating reference frame. A low pass filter is connected to the transformation block. The output of this filter provides a fundamental portion of the voltage at the capacitor terminals in the rotating reference frame. A rectifier reference current generator is connected to the filter for determining the active portion of the output current as follows:

$$i_{p,d} = \frac{P \cdot v_{if,d}}{v_{if,d}^2 + v_{if,q}^2}$$

$$i_{p,q} = \frac{P \cdot v_{if,q}}{v_{if,d}^2 + v_{if,q}^2}$$

where $i_{p,d}$, $i_{p,q}$ are the components of the active portion of the output current in the rotating reference frame, P is the desired power of the load, and $v_{if,d}$ $v_{if,q}$ are components in the rotating reference frame of fundamental portion of the voltage at the capacitor terminals.

The reactive portion of the output current is determined as follows:

$$i_{comp,d} = 2\pi \cdot f \cdot C_i \cdot v_{if,q} \text{ and } i_{comp,q} = 2\pi \cdot f \cdot C_i \cdot v_{if,d}$$

where $i_{comp,d}$, $i_{comp,q}$ are the components of the reactive portion of the output current in the rotating reference frame, f is the fundamental frequency of the power supply, and $C_i$ is the capacitance of each capacitor.

In the illustrated embodiment the load is an inverter and the desired load power is determined as a sum of first and second components. The first component is a calculated power applied to the inverter. This preferably computed by multiplying the input voltage of the inverter by a measured value of the rectifier output current. The second component is determined by a compensator, such as a p.i. compensator, which seeks to minimize the error between the measured value of the output current and a command signal for the inverter.

BRIEF DESCRIPTION OF DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein the reference numerals may bear unique alphabetical suffixes in order to identify specific instantiations of like elements).

DETAILED DESCRIPTION OF ILLUSTRATIVE EMBODIMENTS

The detailed description is divided into three parts. The first portion of the discussion relates to active damping control in order to suppress resonance modes. The second part of the discussion centres on the enhancement of CSI-based drives through the use of feedforward control. These portions of the description are also described in co-pending U.S. application Ser. Nos. 09/515,289 and 09/516,974 and are repeated herein for convenience. The third part of the detailed description focuses on a PWM rectifier having de-coupled power factor and output current control loops and on the use of such a rectifier in an improved CSI-based drive such as discussed in the first two portions of this description.

1. Active Damping Control

Figure 1:
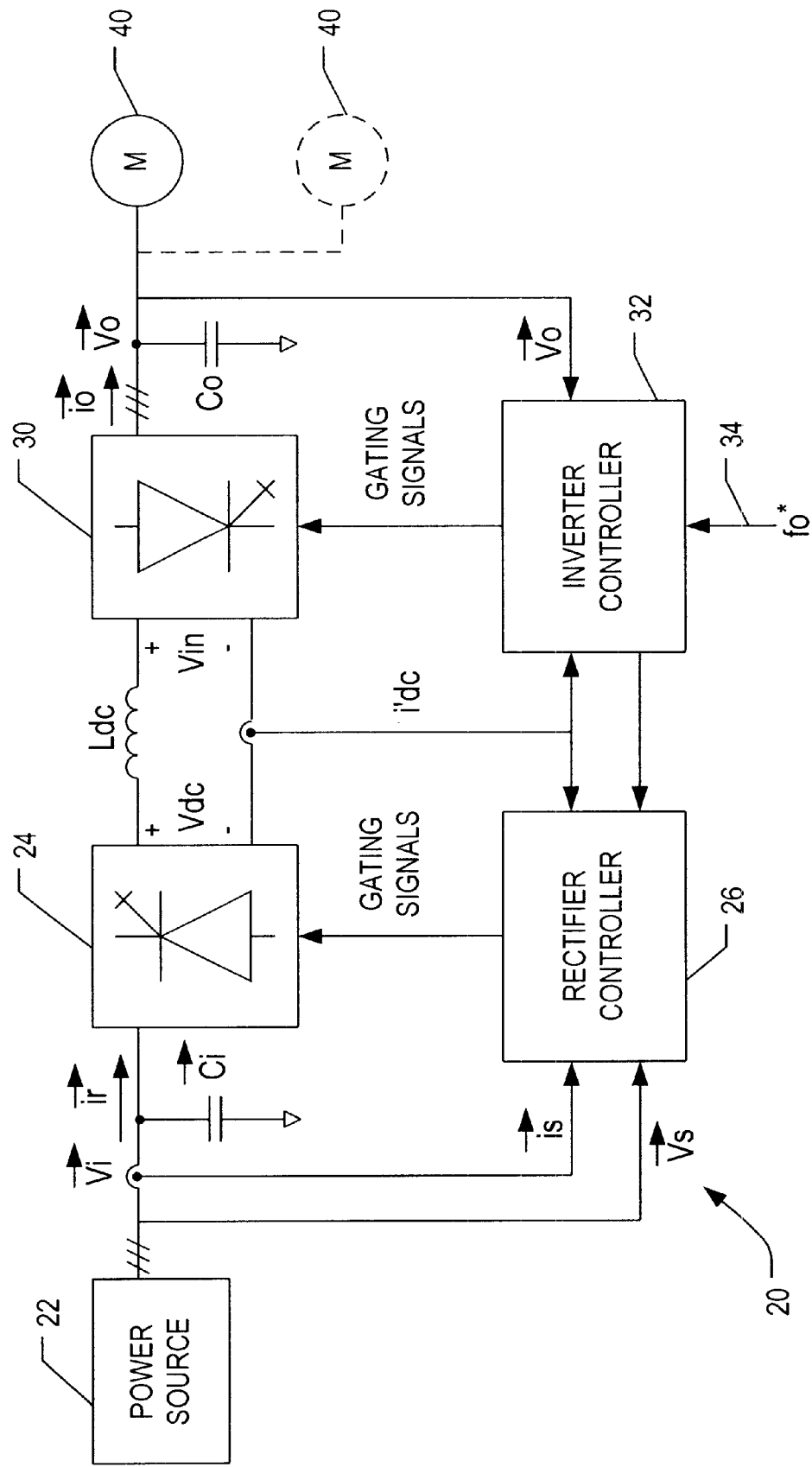
FIG. 1 is a system block diagram of a CSI-based motor drive.

Referring to the drawings, FIG. 1 shows a schematic block diagram of a drive 20 for control of one or more a.c. induction motors 40. The drive 20 comprises a rectifier 24 coupled to a current source inverter 30 via a d.c. link choke or inductor $L_{dc}$. The rectifier 24 converts alternating current supplied from a three-phase power source 22 into direct current which is smoothed by the d.c. link choke $L_{dc}$, thereby providing a current source for the inverter 30. The inverter 30, in turn, converts the d.c. current into a three-phase alternating current (which may vary in terms of its frequency as well as magnitude) for supply to the a.c. induction motor 40.

The current source inverter 30 includes a per phase output filter capacitor $C_o$ which is connected to the load side of the inverter for the purpose of smoothing the output voltage and limiting transient voltage spikes during inverter changes of state. Similarly, depending on the type of rectifier employed, a per phase input filter capacitor $C_i$ may be connected to the line side of the rectifier 24 for the purposes of smoothing the input waveforms. The input filter capacitor also limits the total harmonic distortion and improves the power factor of the line voltages and currents, as typically required by the utility company.

Figure 2:
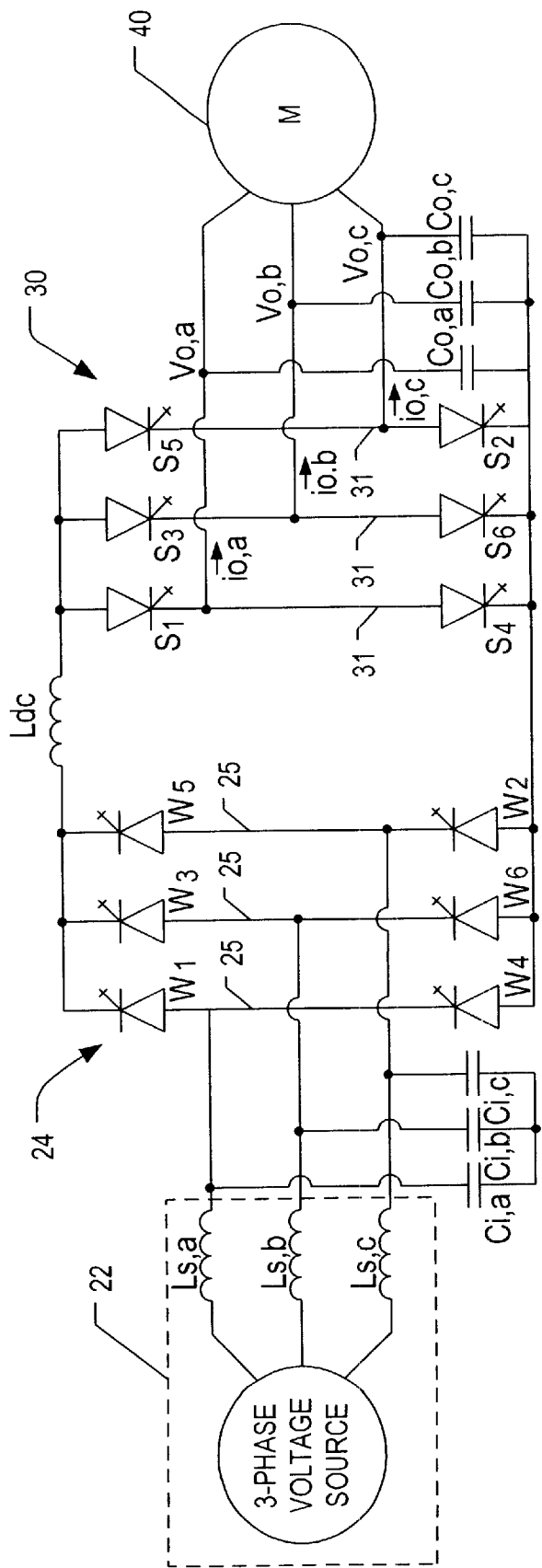
FIG. 2 is a circuit diagram of a rectifier and an inverter of the drive respectively connected to a power source and a motor.

FIG. 2 shows a circuit diagram of the rectifier 24 and inverter 30 as respectively connected to the power source 22 and motor 40. The rectifier 24 includes a three phase switching bridge comprising three legs 25 and six switches $W_1$–$W_6$ such as SCRs, GTOs, GCTs, IGCTs, SGCTs, or IGBTs as shown. The per phase input capacitors $C_{i,a}$, $C_{i,b}$ and $C_{i,c}$ are shown connected in delta formation, but may be alternatively connected in a wye formation. Similarly, the inverter 30 includes a three-phase switching bridge comprising three legs 31 and six GCT, IGCT, SGCT, IGBT or GTO switches $S_1$–$S_6$. The per phase output capacitors $C_{o,a}$ $C_{o,b}$ and $C_{o,c}$ are also shown connected in delta formation but may alternatively be connected in wye formation.

In the illustrated embodiment the drive 20 employs a constant hertz-velocity (CHV) or v/f control. This control technique attempts to keep the motor flux constant throughout the majority of the operating range of the motor, since the flux, ψ, is related to voltage and frequency as follows:

$$\psi = k\frac{v}{f},$$

where k is a constant.

In the CSI inverter, the output voltage $\vec{v}_o$ is controlled by adjusting the inverter output current $\vec{i}_o$. To effect CHV control in a CSI drive, the drive 20 includes an inverter controller 32 which, is connected to a rectifier controller 26. Those skilled in the art will appreciate that while two distinct blocks 20 and 26 have been shown, the control loops provided by these blocks may be implemented in practice through the use of a single digital signal processor or other such microprocessor, as preferred. Those skilled in the art will also understand that analogue circuitry may be used in the alternative.

The external input or command to the drive is provided by a signal 34 which represents a desired motor operating frequency, $f_o^*$ that generally or roughly corresponds to the desired rotational speed of the motor. Such a system can be used, inter alia, in compressor or fan applications where precise speed control is not critical. Alternatively, an outer motor speed feed back control loop may be employed (not shown) which outputs the value for signal 34 (although such a system is typically not used with CHV control).

Figure 3:
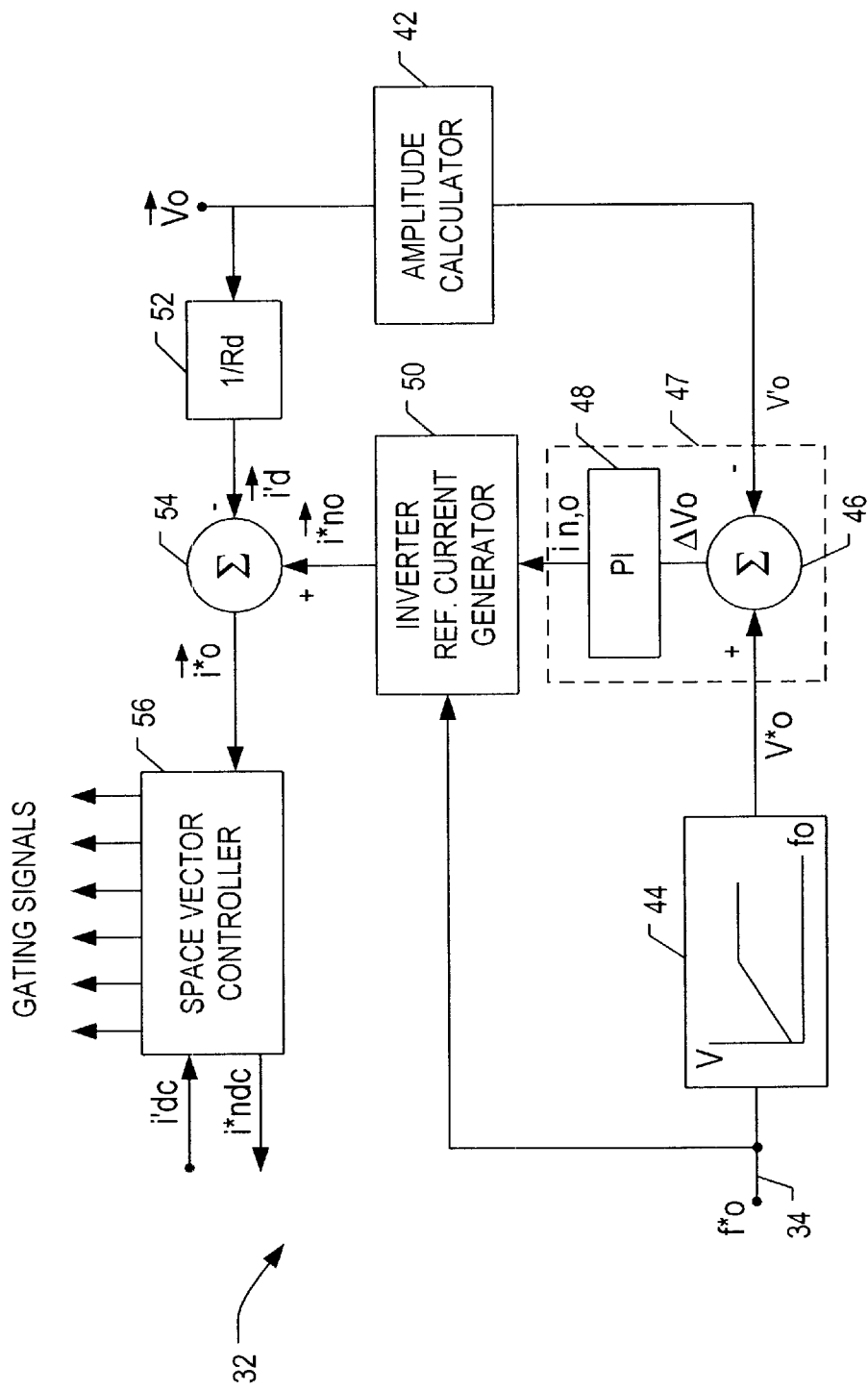
FIG. 3 is a system block diagram of an inverter controller.

FIG. 3 shows the inverter controller 32 in greater detail. The magnitude of the output voltage $\vec{v}_o$ is determined by an amplitude calculator 42 which generates a scalar output feedback voltage $v_o'$. The command operating frequency signal $f_o^*$ is received by a CHV block 44 which computes a desired or command output voltage amplitude $v_o^*$ equal to $k \cdot f_o^*$, k being a pre-selected constant. (Note that the applied voltage is, however, typically limited to the rated voltage of the motor when $f_o^*$ exceeds the rated operating frequency). The output voltage amplitude feedback $v_o'$ and the command voltage amplitude $v_o^*$ are fed into a compensator 47 comprising a summer 46 and a p.i. or p.i.d. controller 48 whose output is a nominal desired output current amplitude $i_{no}$ set to minimize the error $v_o^*-v_o'$ (i.e., $\Delta v_o$) An inverter reference current generator 50, as known in the art per se, receives the output of the p.i. compensator 47 and the command operating frequency signal $f_o^*$ and generates a three-phase nominal reference current $\vec{i}_{no}^*$ having frequency $f_o^*$, each phase being spaced apart by 120°. As discussed in greater detail below, a summer 54 deducts a three-phase damping current $\vec{i}_d$ from the nominal reference current $\vec{i}_{no}^*$ to generate a three-phase reference current $\vec{i}_o^*$. This quantity is fed into a switching pattern generator such as, but not limited to, a space vector controller 56 as known in the art per se which provides the gating signals to the power switches $S_1$–$S_6$ of the inverter 30.

Figure 4:
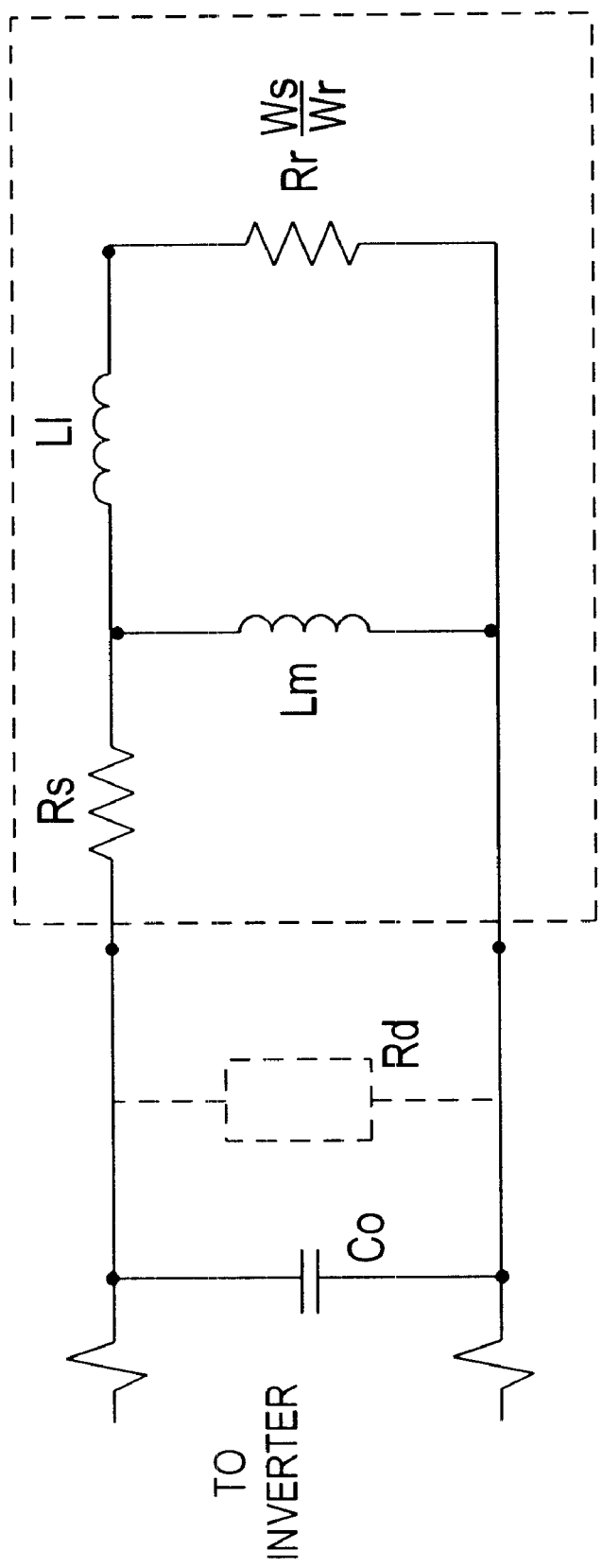
FIG. 4 is a circuit diagram of a per phase steady state equivalent circuit of the motor.

The damping current $\vec{i}_d$ provides active damping control of the resonance between each output filler capacitor $C_o$ and the motor inductances. To explain this in greater detail, additional reference is made to FIG. 4 wherein the per phase steady state equivalent circuit of the output capacitor $C_o$ and the motor 40 is shown. The motor includes a stator resistance $R_s$, a relatively large magnetizing inductance $L_m$, a relatively small leakage inductance $L_1$, and a rotor resistance $$R_r\frac{\omega_s}{\omega_r}$$

whose impedance varies in relation to frequency and load conditions. From FIG. 4 it will be seen that there are two resonance modes caused by the output filter capacitor $C_o$ and the motor inductances. One is a comparatively high frequency resonance mode due to the output filter capacitor $C_o$ and the motor leakage inductance $L_l$. The other is a comparatively low frequency resonance associated with the output filter capacitor $C_o$ and the motor magnetizing inductance $L_m$. The high frequency resonance is usually excited by harmonic currents while the low frequency resonance may fall into the operating frequency range of the motor. If the drive operates at a frequency close to the resonance frequency, it becomes difficult to stabilize the system. For multi-induction motor drives, multiple resonance modes exist which complicate the problem even further.

Conceptually, the resonance modes may be suitably controlled by connecting a damping resistor $R_d$ (shown in phantom) in parallel with the output filter capacitor $C_o$. If the damping resistor $R_d$ is adequately small compared to the motor equivalent impedance, the parallel resonance can be sufficiently suppressed. This technique is not practical due to the high power loss caused by the damping resistor, especially in medium voltage applications. However, the damping effect can be simulated without the corresponding power loss, as follows.

Theoretically, the system block diagrams of FIGS. 1 and 3 can be simplified as shown in FIG. 6(a), where $Z_{mc}(s)$ represents the transfer function of output filter capacitor $C_o$ and induction motor, on a per phase basis. $G_c(s)$, $G_{Pf}(s)$ and $G_f(s)$ denote, respectively, the transfer functions of the amplitude calculator 42, the p.i. controller 48, and the inverter reference current generator 50. The current source inverter 30 and space vector controller 56 are considered as an ideal linear amplifier with a unity gain K. The damping control block 52 is not considered in FIG. 6(a).

Assuming that a damping resistor $R_d$ is connected in parallel with the output filter capacitor $C_o$ and motor, the system block diagram in FIG. 6(a) will be modified as shown in FIG. 6(b).

Figure 6C:
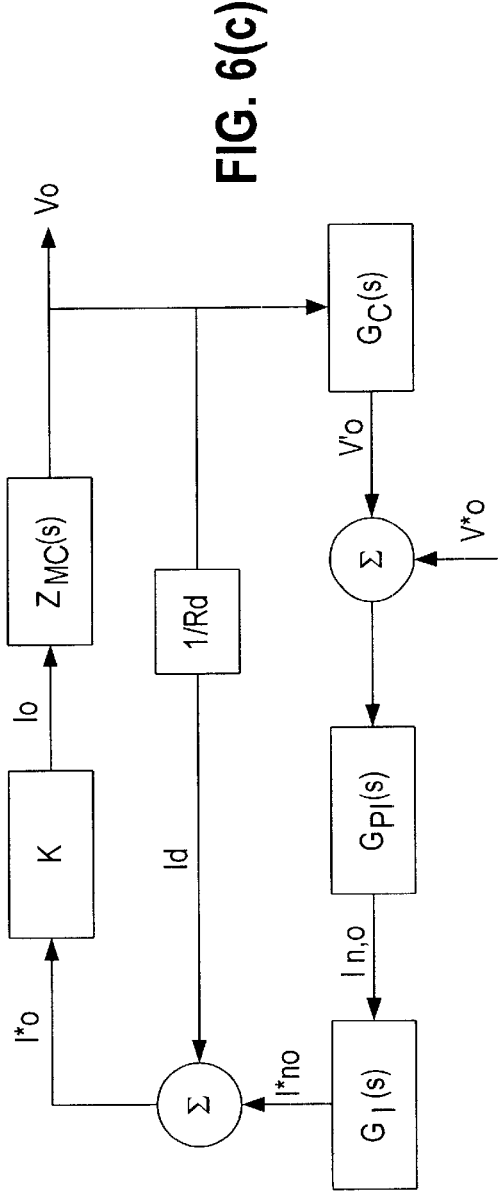
FIG. 6 is a system block diagram of the drive in the frequency domain when it is configured in FIG. 6(a) a conventional manner, FIG. 6(b) with a physical damping resistor, and (c) with an active damping control block.

FIG. 6(c) shows a system block diagram which considers the damping factor block 52. The inverter output voltage $V_o(s)$ in FIG. 6(c) can be expressed as $$V_o(s) = (I_{no}^*(s) - I_d(s)) \cdot K \cdot Z_{mc}(s) \quad [1]$$

from which $$\frac{V_o(s)}{I_{no}^*(s)} = K \cdot \frac{R_d \cdot Z_{mc}(s)}{R_d + Z_{mc}(s)} \quad [2]$$

It will be seen that a similar transfer function is provided by the system block diagram of FIG. 6(b) where a damping resistor is physically used. Thus, it may be expected that the damping current $\vec{i}_d$, determined by $$\frac{\vec{v}_o}{R_d},$$

will likewise fulfil the same function as the physical damping resistor $R_d$ for resonance suppression.

The damping factor $R_d$ may be selected for particular applications by general adherence to the following steps:

First, for multi-motor drives, it is recommended to first calculate base values which depend on the total power rating of the multiple motors. Three base values are required, which are the base value of impedance $Z_b$, the base value of inductance $L_b$ and the base value of capacitor $C_b$. Base value calculations are well known in the art; see, for example, W. D. Stevenson, Jr., "Elements of Power System Analysis", 4th Ed., Mcgraw Hill, N.Y., N.Y., pp. 30–34.

Second, the per unit values of the leakage inductance $L_l$ and the magnetizing inductance $L_m$ for each motor can then be calculated based on the upper calculated base values. Then the multiple motors may be combined into one equivalent motor according to the parallel and series connection principles of electric circuits. The equivalent per unit values can then be obtained.

Third, the switching frequency should be selected. Generally speaking a higher switching frequency implies a higher sampling frequency which results in a better damping effect since a physical resistor can be better approximated. This is subject to the constraint that the switching frequency is usually limited by the power rating of the drive. As a general guideline, it is recommended that the switching frequency be at least 500 Hz.

Fourth, a suitable value for the output capacitor should be selected. In order to suppress the high frequency resonance, it is generally recommended that the sampling frequency of the digital controller be at least five times as high as the resonance frequency. With a high efficiency space vector switching pattern such as described in Trzynadlowski, Andrzej M., "Introduction to Modern Power Electronics", John Wiley & Sons, New York, N.Y., 1998, pp 296–301, 322–326, the sampling frequency is three times as high as the switching frequency. For example, if the switching frequency is 500 Hz, the sampling frequency will be 1500 Hz. In this case, the output filter capacitor may be selected to make the resonance frequency lower than 300 Hz. For large motor drives, the per unit values of the leakage inductance are typically around 0.15–0.2, which means that a 0.3 per unit output filter capacitor is typically large enough to satisfy this recommendation.

Figure 7:
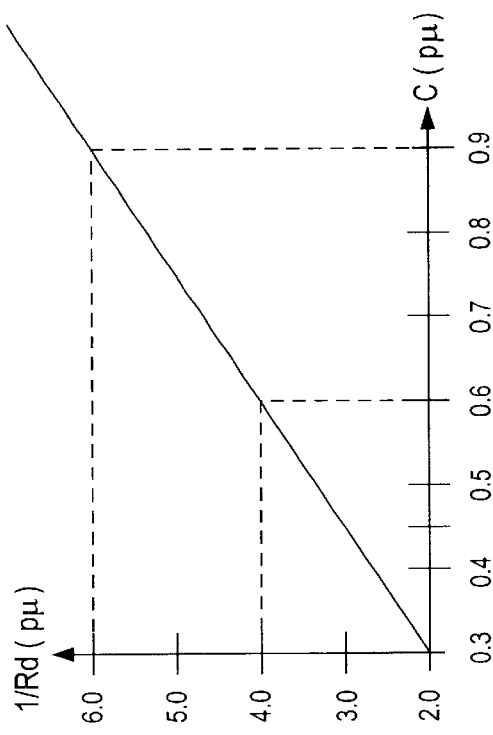
FIG. 7 is a graph showing the relationship between the per unit values of an output filter capacitor and a damping factor at a particular frequency.

Finally, the value of $R_d$ may be selected. In order to achieve an adequate damping effect, it is generally recommended that $R_d$ should be equal to or less than 0.5 per unit. According to the base value of impedance $Z_b$, the real value of $R_d$ can be obtained. FIG. 7 shows the relationship between the per unit value of the capacitor and the damping factor $R_d$ when the switching frequency is 500 Hz.

In the illustrated embodiment, the rectifier 24 is a PWM rectifier which requires the input filter capacitors $C_i$. A high frequency resonance mode also exists between the input filter capacitor $C_i$ and a system inductance $L_s$ associated with the power supply 22, as seen best in FIG. 2. If this resonance frequency is close to a characteristic harmonic of the rectifier (e.g., 5th or 7th), an oscillation will occur, which makes the stability of the PWM rectifier sensitive to the system impedance. Unfortunately it is difficult to measure the system impedance accurately, which complicates the design of a compensating filter. In addition, even when the resonance frequency is not close to any characteristic harmonic of the rectifier, undesired oscillations will also occur during transient states.

Figure 5:
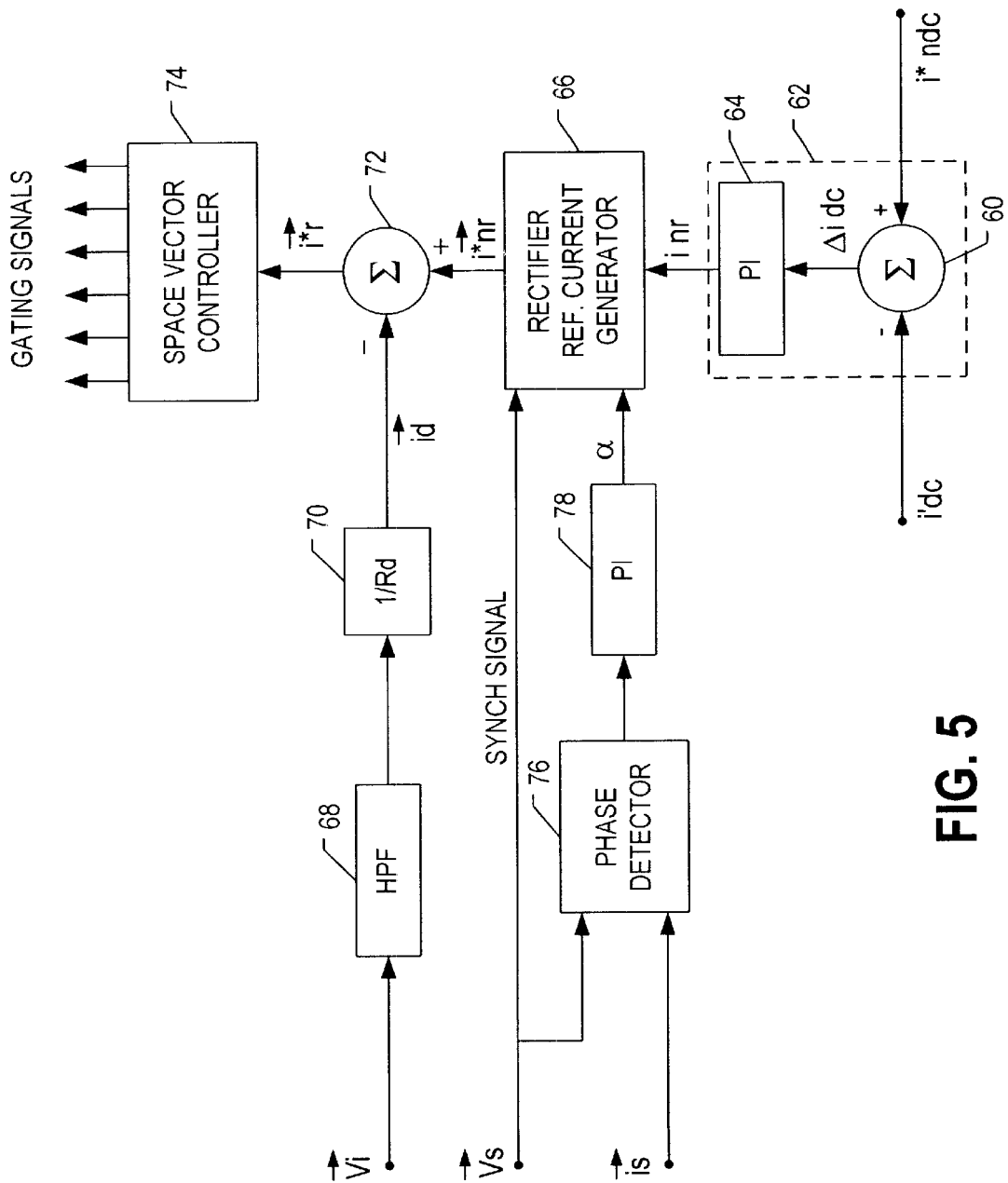
FIG. 5 is a system block diagram of a rectifier controller.

Active damping control may also be used to suppress the resonance mode of the PWM rectifier 24. FIG. 5 shows the PWM rectifier controller 26 in greater detail. The controller 26 features two control loops, one for control of the d.c. link current $i_{dc}$, and one for control of the power factor. With respect to the d.c. link control loop, the inverter controller 32 provides the rectifier controller 26 with a desired or command d.c. link current magnitude $i^*_{ndc}$, which generally corresponds to the magnitude of the inverter reference current $\vec{i}_o^*$. A compensator 62 comprising a summer 60 and a p.i. controller 64 receive $i^*_{ndc}$ and the feedback current $i'_{dc}$. The output of the compensator 64 is a nominal rectifier input current $i_{nr}$ which is fed into a rectifier reference current generator 66. The generator 66 produces a 120° three-phase nominal reference current $\vec{i}_{nr}^*$ having magnitude $i_{nr}$ at the line frequency. The PWM rectifier controller 26 also includes active damping control in order to suppress the high frequency resonance between the input filter capacitor $C_i$ and the system inductance $L_s$ of the power supply. In this case, a high pass filter 68 allows the higher frequency harmonics of the rectifier input voltage $\vec{v}_i$ to pass through a $1/R_d$ damping block 70. Block 70 produces a three phase damping current $\vec{i}_d$ which is deducted by a summer 72 from the nominal rectifier reference current $\vec{i}_{nr}^*$ to produce a rectifier reference current $\vec{i}_r^*$. A second switching pattern generator such as space vector controller 74 generates the gating signal for the power switches $W_1$–$W_6$ of the PWM rectifier.

The power factor control loop attempts to provide a unity power factor relative to the line source, i.e., it is desired that $\vec{i}_s$ be in phase with $\vec{v}_s$ (see FIG. 1). The current $\vec{i}_{C_i}$ through the input filter capacitor $C_i$ will generally lead the voltage $\vec{v}_i$. This enables $\vec{i}_s$ to be in phase with $\vec{v}_s$. This may be accomplished by detecting the phase difference between $\vec{i}_s$ and $\vec{v}_s$ at block 76. If the output of the phase detector 76 is not zero, this represents an error which is compensated for by a p.i. controller 78 whose output is a phase angle α. The rectifier reference current generator 66 establishes $\vec{i}_{nr}^*$ with a phase angle relative to $\vec{v}_i$ equal to α.

The illustrated embodiments have shown rectifier 24 as a PWM rectifier. However, those skilled in the art will appreciate that the drive 20 can be implemented using other types of rectifiers, such as a thyristor rectifier, with or without a d.c. chopper such as a multilevel buck chopper. The PWM rectifier is preferred, however, because it has a better dynamic performance than the thyristor rectifier, and is more suitable in terms of power loss in medium voltage applications than d.c. choppers.

Similarly, while the switching pattern generator for the rectifier or inverter has been shown as a space vector controller, those skilled in the art will understand that the invention is not limited to such a commutation technique. Rather, the limiting factor is whether the switching pattern generator can reasonably be considered as a linear amplifier, not taking into account switching harmonics.

2. Feedforward Control of Inverter Input Voltage

Figure 8:
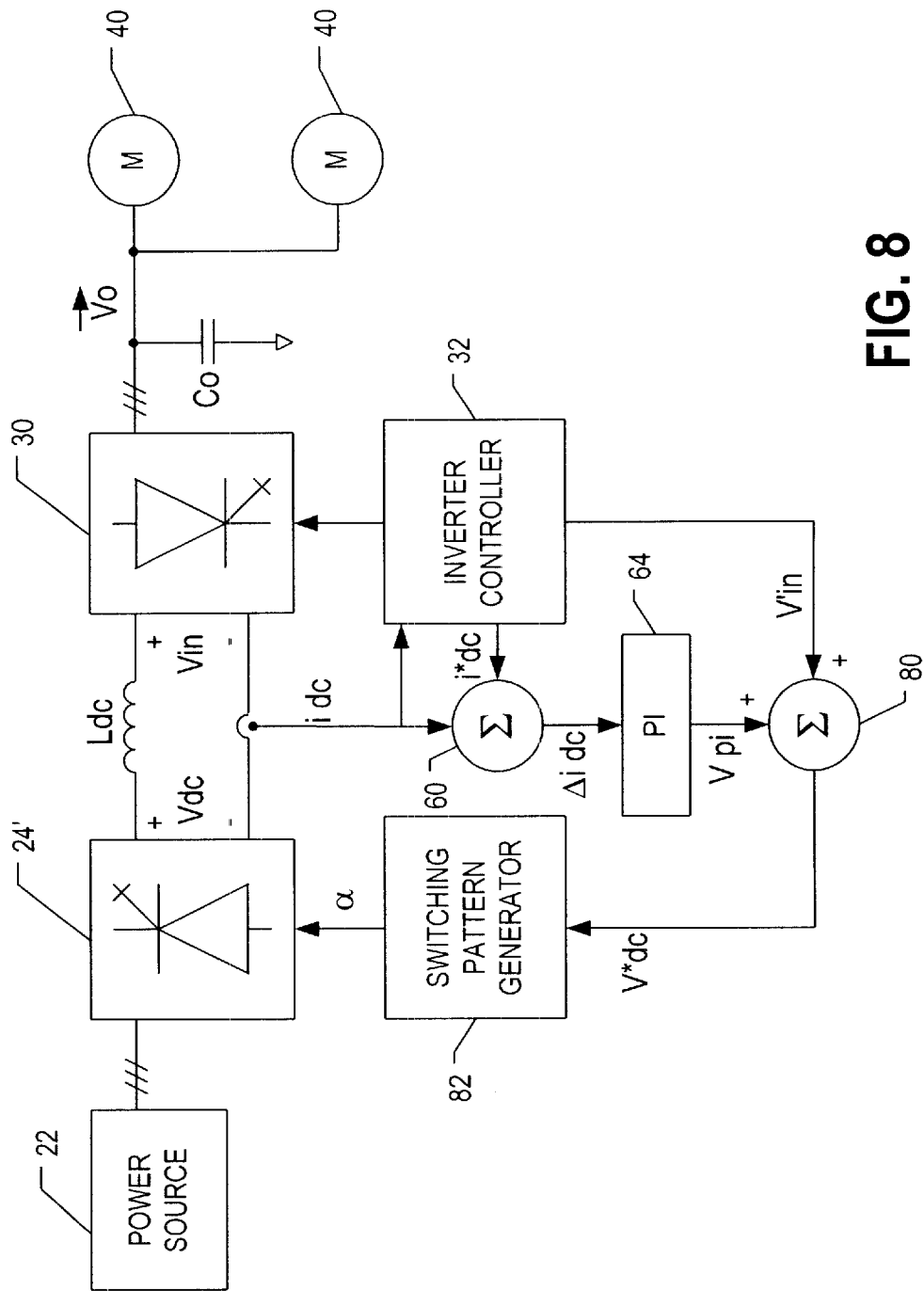
FIG. 8 is a system block diagram of a CSI-based drive which employs a thyristor rectifier.

FIG. 8 shows another version of a CSI based a.c. induction motor drive. In the illustrated embodiment, a phase controlled thyristor rectifier 24' as known in the art per se is employed. In the d.c. link control loop (the power factor control loop is not shown) the output of p.i. controller 64 is a voltage which is fed into a switching pattern generator 82 that provides the gating signals to the thyristors of the rectifier 24'. The illustrated embodiment may or may not employ active damping control for the current source inverter, although it is preferred for the reasons described above.

Referring to FIG. 8, the relationship between the d.c. link current $i_{dc}$, rectifier output voltage $v_{dc}$ and inverter input voltage $v_{in}$ can be expressed by $$v_{dc} = v_{in} + L_{dc}\frac{di_{dc}}{dt} \quad [3]$$

When the drive operates in a steady state condition with a constant d.c. link current, the average value of the rectifier output voltage $v_{dc}$ will be equal to that of the inverter input voltage $v_{in}$. However, under transient conditions, the rectifier output voltage $v_{dc}$ will have two components, namely a voltage drop on the d.c. link choke $L_{dc}$ and the inverter input voltage $v_{in}$. The voltage drop on the d.c. link choke is caused by the fact that in transient conditions, the current flow through the d.c. link choke cannot abruptly change. This causes a problem in the dynamic performance of the rectifier since the output voltage $V_{dc}$ cannot closely follow the changes of the inverter input voltage, yielding a sluggish response.

To improve the dynamic response of the d.c. link current, the illustrated embodiment employs a rectifier input voltage feedforward control loop. In this loop, the inverter controller 32 calculates the inverter side d.c. voltage $v_{in}$ based on the inverter output voltage $v_o$ and the currently active switches. For example, referring to FIG. 2, assume that in a given sampling period $T_s$ switches $S_1$ and $S_2$ are on for a duration $t_i$ and switches $S_1$ and $S_6$ are on for a duration $t_j$. In this case the average value of the inverter side d.c. voltage is calculated by $$v_{in}(avg) = \frac{(v_{o,a} - v_{o,b}) \ast t_i + (v_{o,a} - v_{o,c}) \ast t_j}{T_s} \quad [4]$$

Similar equations can be derived based on the particular switching pattern employed, and the calculations are preferably carried out by the space vector controller 56 (shown in FIG. 3) since it computes the switching pattern. In the alternative, the inverter side d.c. voltage $v_{in}$ can be measured through the use of an additional sensor to thereby provide a different means for determining the inverter side d.c. voltage.

The calculated or measured voltage, $V_{in}'$, can be used as a part of the d.c. voltage reference, $v^*_{dc}$, employed by switching pattern generator 82, that is, $$v_{dc}^* = v_{in}' + v_{pi} \quad [5]$$

where $v_{pi}$ is the output of the d.c. link current p.i. controller 64. As a result, the changes in the inverter output voltage due to the load changes can be directly compensated through the adjustment of the d.c. voltage reference. To effect this, a summer 80 adds the output of the p.i. controller 64 with $v_{in}'$, and the output of the summer is fed to the switching pattern generator 80.

The $v_{in}$ feedforward control has an added feature. In comparing equation [5] to equation [4], note that the output of the p.i. controller represents the voltage drop on the d.c. link choke. This implies that the design of the d.c. link current p.i. controller is mainly associated with $L_{dc}$, independent of other system parameters. In the absence of the feedforward control, the parameters of the p.i. controller may be difficult to determine since the inverter side d.c. voltage $v_{in}$ will depend on the load. This is undesireable, particulalry for multi-motor applications.

The $v_{in}$ feedforward control may also be applied in circumstances where the drive employs a PWM rectifier which employs a switching pattern generator based on a current reference signal. In this case, referring to the drive shown in FIG. 1 and additionally to a more detailed view of the rectifier controller shown in FIG. 9, the measured or calculated value $v_{in}'$ can be multiplied by a multiplier 90 with the measured d.c. link current $i_{dc}$ to determine the active power P' flowing through the inverter. Since the d.c. link choke $L_{dc}$ will ideally not consume any active power, the active power flowing through the rectifier 24' should be the same. Therefore the transient component of the rectifier current $i_r$ (on a per phase basis) arising as a result of the inverter side d.c. voltage $v_{in}$ can be computed by $$\frac{P'}{|\vec{v}_i|},$$

as provided by a divider 92. The multiplier and divider may be thought of as forming part of the means for determining the inverter side d.c. voltage, but which provides a current based output signal rather than a voltage based output signal. A summer 94 adds the output of the p.i. controller 64 with the current-based output signal of the divider 92 to determine the nominal rectifier reference current $i_{nr}$.

3. PWM Rectifier with Independent Control of Active and Reactive Power

Figure 9:
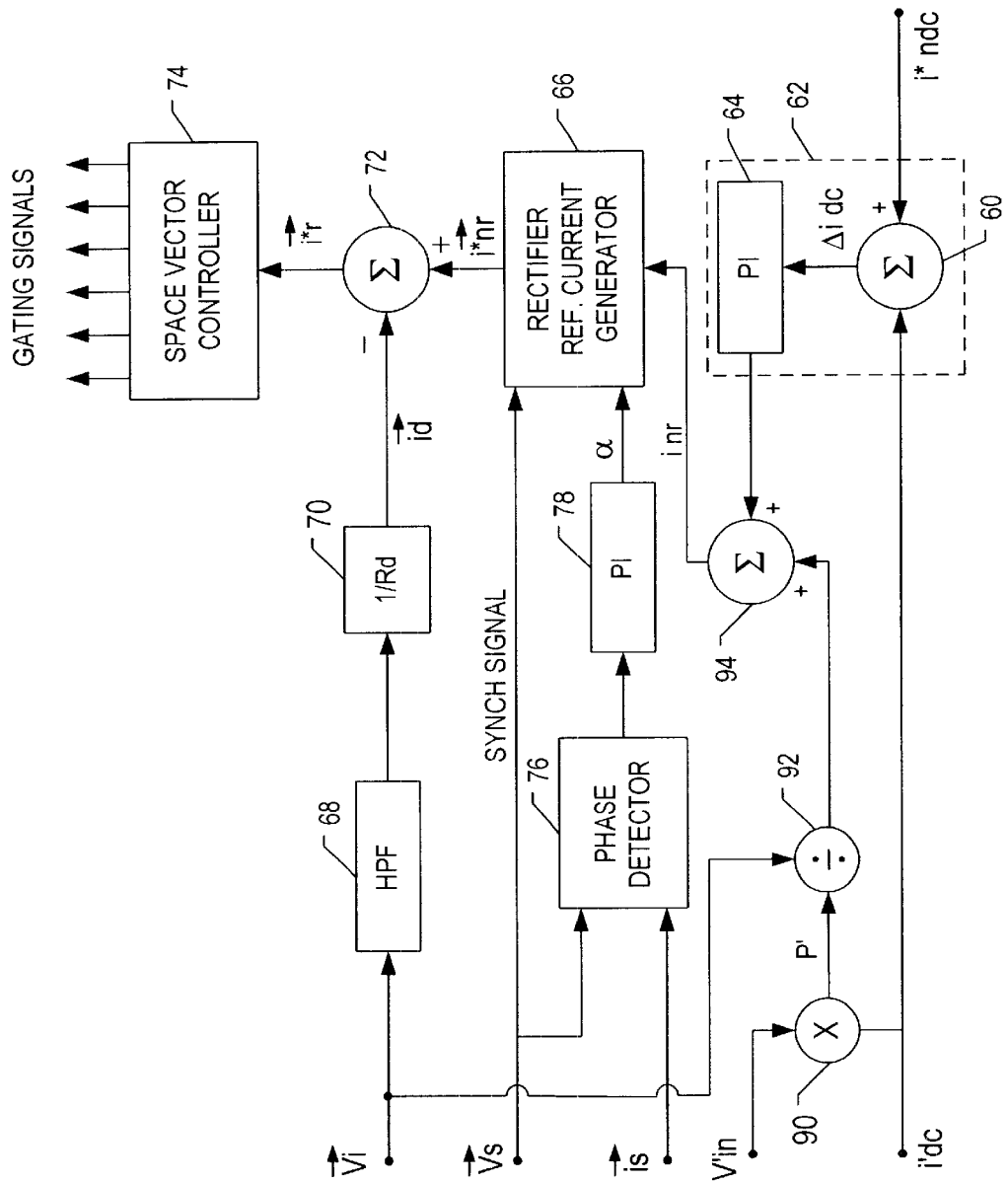
FIG. 9 is a system block diagram of a PWM rectifier controller.
Figure 10:
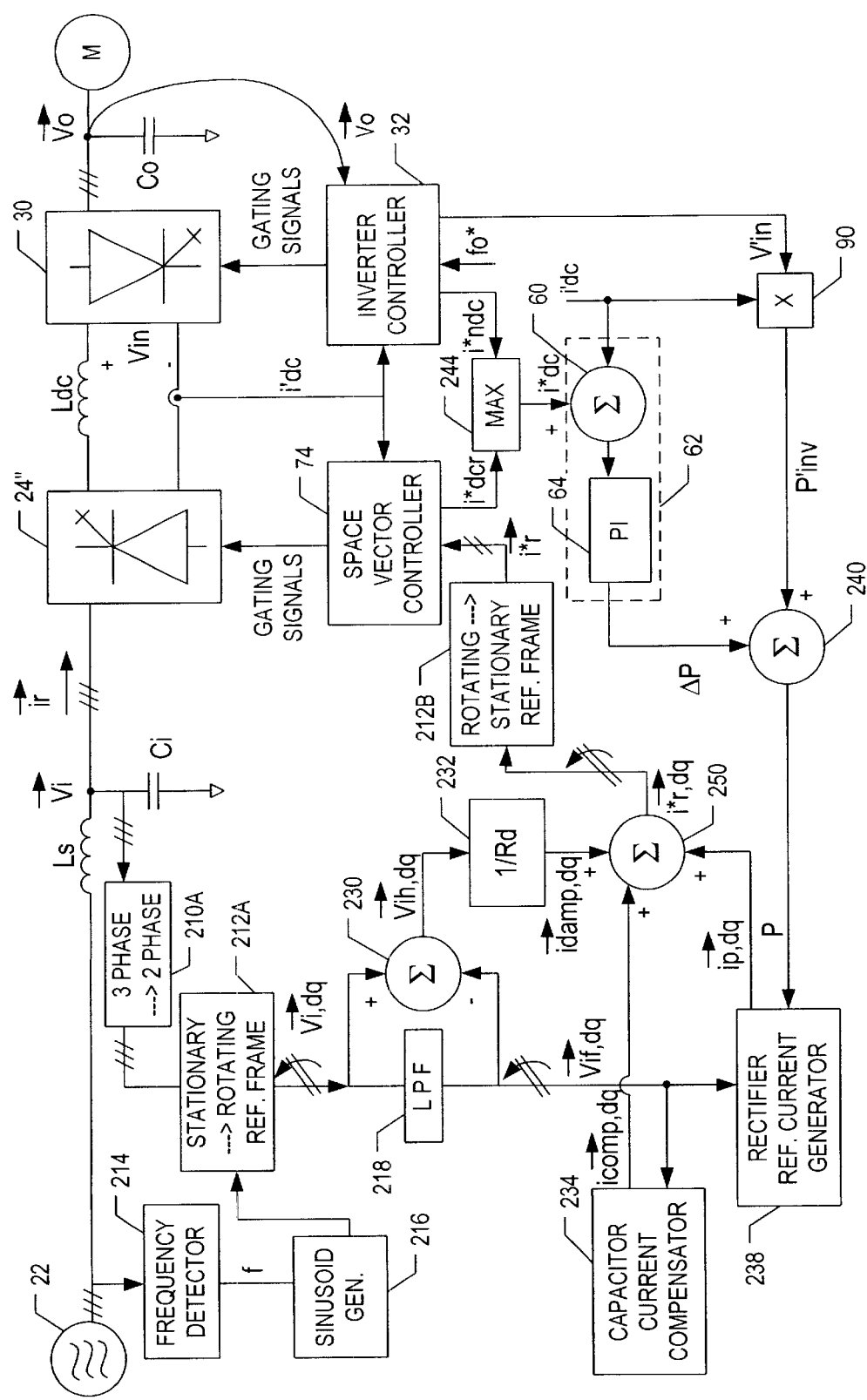
FIG. 10 is a system block diagram of a CSI-based drive which employs a PWM rectifier having de-coupled power factor and d.c. link current control loops.
Figure 11:
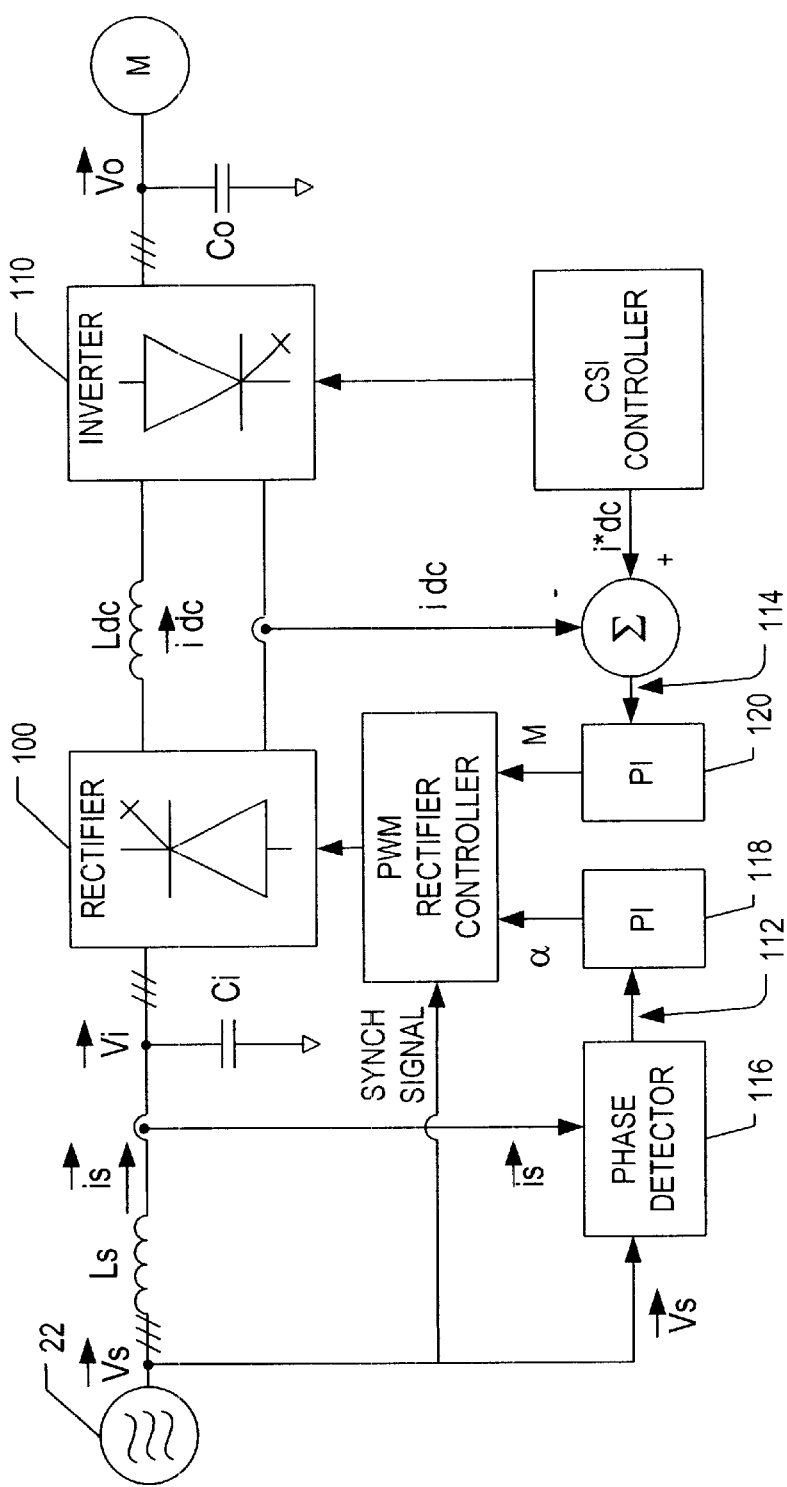
FIG. 11 is a system block diagram of a prior art CSI-based drive which employs a PWM rectifier.

In the the novel PWM rectifiers shown in FIGS. 5 and 9 as well as the prior art PWM rectifier shown in FIG. 11 it can sometimes be difficult to tune the p.i. compensators of the rectifiers because of the coupling or interference between the power factor and output current (i.e., d.c. link current in the CSI drive) control loops thereof. FIG. 10 shows a system block diagram of a novel control scheme for a CSI PWM rectifier 24" wherein the power factor control loop and the d.c. link current control loop are de-coupled by separately controlling the active power and the reactive power of the rectifier. The active power is used to control the d.c. link current and the reactive power is used to control the power factor.

The embodiment illustrated in FIG. 10 also employs an active damping control loop to suppress the resonance problem between the input filter capacitance $C_i$ and the system inductance $L_s$ of the power supply 22. With this in mind, the rectifier reference current $\vec{i}_r^*$ (which is fed into a switching pattern generator such as space vector controller 74) can be considered to contain three parts, an active current $\vec{i}_p$, a reactive capacitor compensation current $\vec{i}_{comp}$ and an active damping current $\vec{i}_{damp}$, which can be expressed as follows:

$$\vec{i}_r^* = \vec{i}_p + \vec{i}_{comp} + \vec{i}_{damp} \quad [6]$$

The active current $\vec{i}_p$ provides the active power needed by the PWM inverter 30 and the adjustment for the d.c. link current, the capacitor compensation current $\vec{i}_{comp}$ compensates the current through the input filter capacitor $C_i$, and the damping current $\vec{i}_{damp}$ suppresses the high frequency $L_sC_i$ resonance.

In order to facilitate the determination and calculation of these quantities, various three phase quantities are transformed to/from a two-dimensional rotating reference frame. First, the three phase rectifier input voltage $\vec{v}_i$ is transformed into a two phase quantity as known in the art per se by a trandformation block 210A. An illustrative transformation equation is:

$$\begin{bmatrix} u_\alpha \\ u_\beta \end{bmatrix} = \frac{2}{3} \begin{bmatrix} 1 & -\frac{1}{2} & -\frac{1}{2} \\ 0 & \frac{\sqrt{3}}{2} & \frac{\sqrt{3}}{2} \end{bmatrix} \begin{bmatrix} u_a \\ u_b \\ u_c \end{bmatrix} \quad [7]$$

where u represent the transorm variable, susbcripts a,b,c represent each of the three-phase components, and subscripts α, β represent each of the two-phase components.

Then the two phase quantity is transformed as known in the art per se to a rotating field of reference by a tranformation block 212A. An illustrative transformation equation is:

$$\begin{bmatrix} u_d \\ u_q \end{bmatrix} = \begin{bmatrix} \cos(\omega t + \theta) & \sin(\omega t + \theta) \\ -\sin(\omega t + \theta) & \cos(\omega t + \theta) \end{bmatrix} \begin{bmatrix} u_\alpha \\ u_\beta \end{bmatrix} \quad [8]$$

where u represents the transorm variable, subscripts α, β represent each component in the stationary frame of reference, subscripts d,q represent each component in the rotating frame of reference, ω is the angular frequency of the fundamental component of $\vec{v}_i$ and θ is an arbitrary phase angle.

In order to determine ω a detector 214 determines the frequency f of the source voltage $\vec{v}_s$. A sinusoidal wave generator 216 produces a reference sinusoid at the source voltage frequency f (which is the frequency of the fundamental component of $\vec{v}_i$) for use by the transformation block 212A (as well as a reverse transformation block 212B). The output of block 212A is the rectifier input voltage $\vec{v}_i$ as represented in a reference frame rotating at the fundamental frequency. This quantity is designated as $\vec{v}_{i,dq}$. Note that as a result of the foregoing transformations the d.c. component of $\vec{v}_{i,dq}$ represents the fundamental portion of the rectifier input voltage and the sinusodal component of $\vec{v}_{i,dq}$ represents the higher harmonic portions of the rectifier input voltage.

The output of the transformation block 212A is fed to a digital low pass filter 218 as known in the art per se. The output of the filter 218 substantially represents the fundamental portion of the rectifier input voltage, which is designated as $\vec{v}_{if,dq}$. So far, blocks 210, 212, 214, 216 and 218 are common to each of the power factor, d.c. link current and damping current control loops.

In the damping current control loop, a summer 230 is used to deduct the fundamental portion of the rectifier input voltage $\vec{v}_{if,dq}$ from $\vec{v}_{i,dq}$. This yields a quantity $\vec{v}_{ih,dq}$ which represents the higher harmonic portions of the rectifier input voltage responsible for the high frequency $L_sC_i$ resonance. The output of the summer 230 is fed to a $1/R_d$ damping block 232. This provides the active damping control, as described above. The output of block 232 provides the damping current in the d-q frame, $\vec{i}_{damp,dq}$. More specifically, this is calculated in block 232 as follows:

$$i_{damp,d} = \frac{v_{ih,d}}{R_d} \text{ and } i_{damp,q} = \frac{v_{ih,q}}{R_d} \quad [9]$$

where $v_{ih,d}$ and $v_{ih,q}$ respectively represent the d and q components of $\vec{v}_{ih,dq}$, and $i_{damp,d}$ and $i_{damp,q}$ respectively represent the d and q components of $\vec{i}_{damp,dq}$.

In the power factor control loop the capacitor compensation current $\vec{i}_{comp}$ is calculated in the d-q frame by a compensator block 234. $\vec{i}_{comp,dq}$ is computed based on the fundamental components of the rectifier input voltage, $\vec{v}_{if,dq}$, as follows:

$$i_{comp,d} = 2\pi \cdot f \cdot C_i \cdot v_{if,q} \text{ and } i_{comp,q} = -2\pi \cdot f \cdot C_i \cdot v_{if,d} \quad [10]$$

where f is the fundamental frequency and $i_{comp,d}$, $i_{comp,q}$ respectively represent the d and q components of $\vec{i}_{comp,dq}$. Equation 10 is derived as follows: By definition $\vec{v}_{if} = v_{if,d} + jv_{if,q}$. The current through the input filter capacitor $$\vec{i}_c = \vec{v}_{if} \cdot \frac{1}{x_c},$$

where $x_c$ is the impedance of the capacitor, which is equal to $$\frac{1}{2\pi f C_i}.$$

Thus $\vec{i}_c = -2\pi f C_i \cdot v_{if,q} + j2\pi f C_i \cdot v_{if,d}$. To conpensate for the capacitor current set $\vec{i}_{comp} = -\vec{i}_c$. Therefore $\vec{i}_{comp} = 2\pi f C_i \cdot v_{if,q} - j2\pi f C_i \cdot v_{if,d}$.

In the d.c. link current control loop a rectifier reference current generator 238 determines the active current $\vec{i}_p$ in the d-q frame. The d and q components of $\vec{i}_{p,dq}$ are obtained through the following equations in the d-q frame based on a desired active power P of the rectifier:

$$i_{p,d} = \frac{P \cdot v_{if,d}}{v_{if,d}^2 + v_{if,q}^2} \text{ and } i_{p,q} = \frac{P \cdot v_{if,q}}{v_{if,d}^2 + v_{if,q}^2} \quad [11]$$

where, $v_{if,d}$ and $v_{if,q}$ are the fundamental components of the rectifier input voltage in the d-q frame. Equation 11 is derived as follows: In the d-q frame the active power P and reactive power Q are defined as $P = v_{if,d} \cdot i_{p,d} + v_{if,q}$ and $Q = v_{if,}$ $d \cdot i_{p,q} - v_{if,q} \cdot i_{p,d}$. Since $\vec{i}_p$ is only used for the production of active power, reactive power is set to zero. Equation 11 is thus the solution to the following two equations of two variables, $P = v_{if,d} \cdot i_{p,d} + v_{if,q} \cdot i_{p,q}$ and $0 = v_{if,d} \cdot i_{p,q} - v_{if,q} \cdot i_{p,d}$.

In the illustrated CSI-based drive, the desired active power P is calculated by a summer 240 as follows:

$$P = p_{inv}' + \Delta p \qquad [12]$$

where $p_{inv}'$ is a calculated inverter side active power and $\Delta p$ is the output of a d.c. link current p.i. compensator 62. The inverter side active power $p_{inv}'$ is computed by a multiplier 90 as follows:

$$p_{inv}' = v_{in}' \cdot i_{dc}' \qquad [13]$$

where $v_{in}'$ is the calculated inverter side d.c. voltage (as previously described) and $i'_{dc}$ is the detected d.c. link current. With this inverter side active power feedforward control, the rectifier can follow the active power change of the inverter rapidly and the output $\Delta p$ of the p.i. compensator 62 is only used to control any change in the d.c link current $i_{dc}$. The dynamic performance of the rectifier can thus be improved and the parameter selection of the p.i. compensator 62 can be simplified.

The inputs to the p.i. compensator 52 are the detected d.c. link current $i'_{dc}$ and a command d.c. link current magnitude $i_{dc}^*$. Note that if the command signal for the d.c. link current is only produced by the inverter controller 32, then under some operating conditions the modulation index of the rectifier may be saturated. To solve this problem the inverter controller 32 generates a d.c. link current command signal $i_{ndc}^*$ and the rectifier 24'' also generates a d.c. link current command signal $i_{dcr}^*$ (Note that $i_{ndc}^*$ and $i_{dcr}^*$ need not necessarily be the same value. For example, when the inverter is under a no-load condition, there is no requirement for the d.c. link current $i_{dc}$ so $i_{ndc}^*$ is zero. At the same time, to obtain unity power factor at the rectifier the compensation current must be provided to the capacitor $C_i$ and so $i_{dcr}^*$ is not zero.) A comparator 244 selects the larger of these two signals as the d.c. link current command $i_{dc}^*$. With this control strategy, the rectifier 24'' will not be saturated under any operating conditions and unity power factor control can be achieved. With unity power factor control, the worst case scenario is substantially the rated load condition. So, if a 0.3 per unit input filter capacitor $C_i$ is connected, the capacitor compensation current will also be 0.3 per unit. With a 1 per unit active current, the total rectifier current will be 1.044 per unit, which means that the unity power factor control only causes a little increase on the rectifier rated current.

The three control loops merge again at a summer 250 which adds $\vec{i}_{p,dq}$, $\vec{i}_{damp,dq}$, and $\vec{i}_{damp,dq}$ together to determine the rectifier reference current $\vec{i}_{r,dq}'$ in the d–q frame. This quantity is converted back to a two-phase quantity $\vec{i}_r'$ via the reverse transformation block 212B and fed to the rectifier space vector controller 74 which employs two phase quantities and internally generates three phase quantities (i.e., reverse two to three phase transformation block 210B is located within controller 74).

The reverse transformation equations implemented by blocks 212B and 210B are, respectively:

$$\begin{bmatrix} u_\alpha \\ u_\beta \end{bmatrix} = \begin{bmatrix} \cos(\omega t + \theta) & -\sin(\omega t + \theta) \\ \sin(\omega t + \theta) & \cos(\omega t + \theta) \end{bmatrix} \begin{bmatrix} u_d \\ u_q \end{bmatrix} \qquad [14]$$

$$\begin{bmatrix} u_a \\ u_b \\ u_c \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} u_\alpha \\ u_\beta \end{bmatrix} \qquad [15]$$

Note that while two separate transformations have been shown to convert three-phase quantities into two phase quantities into a rotating reference frame, those skilled in the understand that a single transformation matrix can be employed in the alternative. Also, while a three phase system has been shown herein it will be understood that the invention can be more generally applied to an m-phase system, m>=1. Furthermore, while the illustrated embodiment achieves a unity power factor a non-unity power factor can also be achieved by introducing a factor into equation 10. Similarly, those skilled in this art will understand that numerous other modifications and variations may be made to the embodiments described herein without departing from the spirit or scope of the invention.

What is claimed is:

1. A rectifier, comprising:

a switching bridge for converting alternating current into direct current, said bridge having a line side and a load side, m input filter capacitors, each connected at a terminal thereof to the line side of the bridge, wherein an m-phase a.c. power supply having a per phase system inductance is connectable to the m terminals, m being an integer greater than or equal to one;

the load side having a smoothing inductor, a load being connectable to the smoothing inductor;

a switching pattern generator for controlling switches in the switching bridge based on a reference output current;

a first control loop for determining an active portion of the reference output current based on a desired power level of the load and an m-phase voltage at said terminals; and a second control loop for determining a reactive portion of the reference output current based on the m-phase voltage at said terminals, the reactive portion being selected so as to obtain a desired per phase power factor on the power supply.

2. The rectifier according to claim 1, wherein m=3 and including a block for transforming the m-phase voltage at said terminals into a two-phase voltage in a rotating reference frame.

3. The rectifier according to claim 2, including a low pass filter connected to the transformation block, whereby the output of the filter provides a fundamental portion of the voltage at said terminals in the rotating reference frame.

4. The rectifier according to claim 3, wherein the active portion of the reference output current is determined as follows:

$$i_{p,d} = \frac{P \cdot v_{if,d}}{v_{if,d}^2 + v_{if,q}^2}$$

and $$i_{p,q} = \frac{P \cdot v_{if,q}}{v_{if,d}^2 + v_{if,q}^2}$$

where $i_{p,d}$, $i_{p,q}$ are the components of the active portion of the reference output current in the rotating reference frame, P is the desired power of the load, and $v_{if,d}$ $v_{if,q}$ are components in the rotating reference frame of fundamental portion of the voltage at said terminals.

5. The rectifier according to claim 4, wherein the reactive portion of the reference output current is determined as follows:

$$i_{comp,d} = 2\pi \cdot f \cdot C_i \cdot v_{if,q} \text{ and } i_{comp,q} = 2\pi \cdot f \cdot C_i \cdot v_{if,d}$$

where $i_{comp,d}$, $i_{comp,q}$ are the components of the reactive portion of the reference output current in the rotating reference frame, f is the fundamental frequency, and $C_i$ is the capacitance of each said capacitor.

6. The rectifier according to claim 5, including a summer for adding the active and reactive portions of the reference output current.

7. The rectifier according to claim 6, wherein:
the load is an inverter; and
the desired load power is determined as a sum of first and second components, the first component being a calculated power applied to the inverter, and the second component being an output of an error minimizing compensator having as inputs a measured value of the output current and a command output current signal.

8. The rectifier according to claim 7, wherein the calculated power is computed by multiplying an input voltage of the inverter with the measured value of the rectifier output current.

9. An a.c. induction motor drive, comprising:
a rectifier, said rectifier having (a) a switching bridge for converting alternating current into direct current, said bridge having a line side and a load side, (b) m input filter capacitors, each connected at a terminal thereof to the line side of the bridge, wherein an m-phase a.c. power supply having a per phase system inductance is connectable to the m terminals, m being an integer greater than or equal to one, (c) a switching pattern generator for controlling switches in the switching bridge based on a reference output current, (d) a first control loop for determining an active portion of the reference output current based on a desired power level of the load and an m-phase voltage at said terminals, and (e) a second control loop for determining a reactive portion of the reference output current based on the m-phase voltage at said terminals, the reactive portion being selected so as to obtain a desired per phase power factor on the power supply;
a d.c. link choke connected to the load side of the switching bridge; and
a current source inverter connected to the d.c. link choke, the a.c. induction motor being connectable to the current source inverter.

10. The drive according to claim 9, wherein m=3 and including a block for transforming the m-phase voltage at said terminals into a two-phase voltage in a rotating reference frame.

11. The drive according to claim 10, including a low pass filter connected to the transformation block, whereby the output of the filter provides a fundamental portion of the voltage at said terminals in the rotating reference frame.

12. The drive according to claim 11, wherein the active portion of the reference output current is determined as follows:

$$i_{p,d} = \frac{P \cdot v_{if,d}}{v_{if,d}^2 + v_{if,q}^2}$$

and $$i_{p,q} = \frac{P \cdot v_{if,q}}{v_{if,d}^2 + v_{if,q}^2}$$

where $i_{p,d}$, $i_{p,q}$ are the components of the active portion of the reference output current in the rotating reference frame, P is the desired power of the load, and $v_{if,d}$ $v_{if,q}$ are components in the rotating reference frame of fundamental portion of the voltage at said terminals.

13. The drive according to claim 12, wherein the reactive portion of the reference output current is determined as follows:

$$i_{comp,d} = 2\pi \cdot f \cdot C_i \cdot v_{if,q} \text{ and } i_{comp,q} = 2\pi \cdot f \cdot C_i \cdot v_{if,d}$$

where $i_{comp,d}$, $i_{comp,q}$ are the components of the reactive portion of the reference output current in the rotating reference frame, f is the fundamental frequency, and $C_i$ is the capacitance of each said capacitor.

14. The drive according to claim 13, including a summer for adding the active and reactive portions of the reference output current.

15. The drive according to claim 14, wherein the desired load power is determined as a sum of first and second components, the first component being a calculated power applied to the inverter, and the second component being an output of an error minimizing compensator having as inputs a measured value of the output current and a command output current signal.

16. The drive according to claim 15, wherein the calculated power is computed by multiplying an input voltage of the inverter with the measured value of the rectifier output current.

* * * * *